United States Patent [19]

Copeland

[11] 3,878,893

[45] Apr. 22, 1975

[54] METHOD FOR FORMING A CONSOLIDATED GRAVEL PACK IN A WELL BOREHOLE

[75] Inventor: Claude T. Copeland, Tulsa, Okla.

[73] Assignee: The Dow Chemical Company, Midland, Mich.

[22] Filed: Oct. 19, 1973

[21] Appl. No.: 408,240

Related U.S. Application Data

[63] Continuation-in-part of Ser. No. 295,732, Oct. 6, 1972, abandoned.

[52] U.S. Cl. ............................... 166/276; 166/295
[51] Int. Cl. ............................................. E21b 43/02
[58] Field of Search ...................... 166/276, 278, 295

[56] References Cited
UNITED STATES PATENTS

| 2,815,815 | 12/1955 | Hower et al. | 166/276 |
|---|---|---|---|
| 3,170,516 | 2/1965 | Holland et al. | 166/295 |
| 3,297,089 | 1/1967 | Spain | 166/295 |
| 3,335,796 | 8/1967 | Parker | 166/276 |
| 3,428,122 | 2/1969 | Methuen et al. | 166/295 |
| 3,548,942 | 12/1970 | Terry | 166/276 |
| 3,621,915 | 11/1971 | Bruist et al. | 166/276 |
| 3,625,287 | 12/1971 | Young | 166/295 |
| 3,646,999 | 3/1972 | Hamby et al. | 166/295 |
| 3,696,867 | 10/1972 | Waid | 166/276 |
| 3,709,298 | 11/1973 | Parmann et al. | 166/276 |
| 3,750,768 | 8/1973 | Suman et al. | 166/295 |
| 3,760,880 | 9/1973 | Dollarhide | 166/276 |

Primary Examiner—Stephen J. Novosad
Assistant Examiner—Jack E. Ebel
Attorney, Agent, or Firm—Bruce M. Kanuch

[57] ABSTRACT

A method for providing a permeably consolidated gravel pack in a well borehole penetrating a subterranean formation is provided. In this method a slurry composition is prepared containing a particulate material coated with an uncured epoxy resin and a curing agent slurried in a hydrocarbon oil. The slurry is injected into the well bore and formation until a screen out occurs. The well is shut in until the resin coated particulate mass cures to form a consolidated permeable sand or gravel pack. A portion or all of the consolidated mass in the well bore is then removed therefrom.

11 Claims, No Drawings

METHOD FOR FORMING A CONSOLIDATED GRAVEL PACK IN A WELL BOREHOLE

CROSS REFERENCE TO RELATED APPLICATION

This application is a continuation-in-part of application Ser. No. 295,732, filed Oct. 6, 1972 and now abandoned.

BACKGROUND OF THE INVENTION

Sand production from unconsolidated subterranean formations producing a petroleum liquid is an ever present problem to the petroleum industry. Two commonly used methods employed in an attempt to solve the sand production problem are (1) gravel packing and (2) plastic in situ consolidation. In a gravel packing procedure gravel, e.g. coarse sand, is packed or otherwise placed so that all the oil produced must pass through the pack before entering the production tubing. The gravel pack acts as a filter entrapping sand which is being carried by the oil. Several techniques have been employed in an effort to render the gravel pack a more efficient filter. One line of technology involves permeably consolidating the gravel pack with a resin material. U.S. Pat. Nos. 3,404,735; 3,391,738; 3,621,915 and 3,625,287 all teach different techniques which have been employed to consolidate gravel packs with a resinous material. However, all of these known techniques suffer from one or more disadvantage. In some of these techniques a certain amount of the resin from the gravel pack slurry is lost to the formation thus impeding the flow of fluids therefrom. In other systems the screen out and setting up of the resin in the borehole must be avoided since the set mass is very difficult to drill out. In U.S. Pat. No. 2,621,915 it is emphasized that resin coated sand must not be allowed to cure in a well bore unless a screen assembly is present, see col. 1, lines 73-75 and col. 5, line 5 through col. 7, line 7. In many of the techniques a screen or slotted liner must be placed inside the well bore to prevent the migration of gravel from the gravel pack. In other techniques the gravel or sand employed for the gravel pack must be blended with the consolidating resin prior to mixing it with a carrying liquid, e.g. U.S. Pat. No. 3,621,915. This thus involves an additional step in the process and the handling of viscous resin coated sand. Furthermore, in prior art methods a compromise has had to be made between compressive strength and permeability. The present invention concerns a method of forming a permeable consolidated gravel pack in a well bore wherein the disadvantages associated with similar prior art methods are overcome.

SUMMARY OF THE INVENTION

In the present invention a slurry composition containing an epoxy resin coated sand, a carrier liquid, a solvent for said resin, a curing agent, a coupling agent and optionally a curing accelerator is pumped into a well bore and into communication with a producing formation. A mass of the resin coated sand is screened out on the face of the formation and allowed to cure into a permeable consolidated mass. In a preferred embodiment the resin coated sand is also placed in the well bore and in communication with the face of the producing formation. The entire gravel pack is allowed to cure and a portion or all of the gravel pack which has cured in the well bore is then removed. Enhanced filtration is achieved if the cured pack in the well bore is only partially removed. This can be achieved by drilling a hole through the pack on a line which is essentially along the axis of the well bore which is smaller in diameter then the diameter of the well bore.

DETAILED DESCRIPTION OF THE INVENTION

The composition employed in the practice of the present invention comprises a slurry formed by mixing a suitable particulate material in a carrier liquid along with an epoxy resin solvent mixture and a curing agent. Optionally the slurry may contain a coupling agent and curing accelerator.

The epoxy resin employed in the invention comprises those organic materials possessing more than one epoxy group. Examples of the polyepoxides include 1,4-bis(2,3-epoxypropoxy) benzene, 1,3-bis(2,3-epoxypropoxy) benzene, 1,4'-bis(2,3-epoxypropoxy) diphenyl ether, 4,4'-bis(2-methoxy-3,4-epoxyburoxy) diphenyl dimethylmethane, 1,4-bis(2-methoxy-4,5-epoxypentoxy) benzene.

Other examples include the epoxy polyethers of polyhydric phenols obtained by reacting a polyhydric phenol with a halogen-containing epoxide of dihalohydrin in the presence of an alkaline medium. Polyhydric phenols that can be used for this purpose include resorcinol, catechol, hydroquinone, methyl resorcinol, or polynuclear phenols, such as 2,2-bis(4-hydroxyphenyl) propane (Bisphenol A), 2,2-bis(4-hydroxyphenyl) butane, 4,4'-dihydroxybenzophenone, bis(4-hydroxyphenyl) ethane, 2,2-bis(4-hydroxyphenyl) pentane, and 1,5-dihydroxynaphthalene. The halogen-containing epoxides may be further exemplified by 3-chloro-1,2-epoxybutane, 2-bromo1,2-epoxyhexane, 3-chloro-1,2-epoxyoctane, and the like. The polyepoxide polymeric products of this invention may be represented by the general formula:

wherein R is a divalent hydrocarbon radical of the dihydric phenol and $n$ is an integer of the series 0, 1, 2, 3, etc.

The above-described preferred glycidyl polyethers of the dihydric phenols may be prepared by reacting the required proportions of the dihydric phenol and the epichlorohydrin in the presence of a caustic such as sodium hydroxide or potassium hydroxide to neutralize the hydrochloric acid formed during reaction. The reaction is preferably accomplished at temperatures within the range of from about 50°C to 150°C. The heating is continued for several hours to effect the reaction and the product is then washed free of salt and base.

Another group of polyepoxides that may be used comprises the glycidyl ethers of novolak resins, polynuclear polyhydroxy phenols, which are obtained by condensing an aldehyde with a polyhydric phenol in the presence of an acid catalyst. Further preparation of novolak resins is described in the book *Phenoplasts*, 1947, p. 29 et seq., by T. S. Carswell. A typical member of this class is the epoxy resin from a condensate of formaldehyde and 2,2-bis(4-hydroxyphenyl) propane novolak resin.

The resin is employed in an amount sufficient to coat the particulate material in the slurry. Careful attention must be made to the maximum amount employed since excess resin will affect the permeability of the cured pack; and also can cause formation damage; and can also make it difficult to remove the portion of the cured pack in the well bore. From about 2 to about 10 pounds, preferably from about 2.5 to about 9 pounds, of resin per 100 pounds of particulate material is employed. More preferably the resin is employed in an amount ranging from about 5 to about 7 pounds per 100 pounds of sand.

A solvent is employed for the resin mixture which in conjunction with the resin is only partially miscible in the carrier liquid. Generally any polar organic solvent for the components of the epoxy resin formulation can be employed. The solvent may be, for example, an organic alcohol, ester, ether, ketone, acetate, etc. Specific solvents include, for example, 2-(2-ethoxyethoxy)-ethanol, ethyl acetate, amyl acetate, methyl ethyl ketone, methisobutyl ketone xylene, ethylene glycol n-butyl ether, diethylene glycol isobutyl ether and the like. The solvent is employed in a quantity to provide a resin-solvent mixture containing about 55 to 85 per cent by weight of resin.

A number of curing agents, activators or catalysts are known which harden unset epoxy resins. These include, for example, amines, dibasic acids and acid anhydrides. The preferred hardening agents are the amines, especially those having a plurality of amino hydrogen groups. Included are aliphatic, cycloaliphatic, aromatic or heterocyclic polyamines, such as diethylene triamine, ethylene diamine, triethylene, tetramine, dimethylamino propylamine, diethylamino propylamine, piperidine, methane diamine, triethyl amine, benzyl dimethylamine, dimethylamino methyl phenol, tridimethyl amino methyl phenol, $\alpha$-methylbenzyl dimethylamine, meta-xylene diamine, 4',4'-dimethylene dianiline, pyridine, and the like. Mixtures of various amines may be preferred. The amines or other curing agent react rather slowly to convert the polyepoxides to an insoluble form. The particular curing agent and concentration thereof can easily be determined by a knowledge of temperature conditions and available working time, i.e. length of time between adding the curing agent and final positioning of the resin-containing mixture downhole.

The curing agent can be employed in an amount ranging from about 40 to more than about 100 percent of that stoichiometrically required. The quantity of certain curing agents employed can effect the ultimate compressive strength of certain resin coated particulate materials and, therefore, in any specific formulation these factors can be determined to provide optimum systems.

The particulate material employed in the slurry can be any of those commonly employed to form gravel packs. Various sands, gravel, walnut hulls and other nut shells, synthetic resins, gilsonite, coke, glass beads and similar particulate materials can be employed. However, in the practice of this invention sand having a diameter ranging from about 0.100 to about 0.0025 inch, preferably from about 0.065 to about 0.01 inch is preferred. The sand is employed in an amount ranging from about 7 to about 20 pounds per gallon, preferably from about 9 to about 15 pounds, of the total liquid system.

The carrier liquid can be any hydrocarbon liquid which does not adversely affect the resin coated sand. Thus, it should not be a solvent for the resin but should be miscible with a portion of the solvent of the resin-solvent mixture. Kerosene, diesel oil, brightstock or any other inert hydrocarbon liquid can be employed. A hydrocarbon oil having a viscosity of from about 100 to 2500 centipoise as measured at a temperature of about 80°F can be employed. Preferably the carrier liquid has a viscosity ranging from about 200 to about 2000 centipoise.

Optionally a coupling agent can be included in the slurry mixture. Suitable coupling agents are compounds having a group or atom which is capable of reacting with or being strongly held by the particulate material and having a reactive organic group which orients outwardly from the particulate material and is capable of combining with the epoxy resin. Specific coupling agents which can be employed when the particulate material is siliceous include organosilicon compounds or silanes; those coupling agents taught in U.S. Pat. No. 3,285,339 at col. 3, line 58 through col. 8, line 60 and those taught in U.S. Pat. No. 3,625,287, col. 2, lines 3-54 can be employed. The teachings of these patents are specifically incorporated herein by reference. When a siliceous material, e.g. sand or glass beads, is employed as the particulate material the coupling agent is employed in an amount ranging from about 0.01 to about 0.25 gallon per 100 pounds of said siliceous particulate material. Preferably from about 0.02 to about 0.12 gallon of a coupling agent per 100 pounds of the particulate material in the slurry is employed.

A catalyst or accelerator can also be employed in the slurry to increase the rate of cure of the epoxy resin. Known accelerators such as salicylic acid, benzoic acid, phenol, etc. in an amount ranging from about 0.5 to about 2.0 percent by weight of the total weight of the resin and curing agent can be employed.

In contrast to the method of forming a slurry and placing the slurry in a well bore to form a pack taught in U.S. Pat. No. 3,621,915 the method of the present invention is practiced as follows.

To a resin-solvent mixture is admixed a curing agent. This mixture is then blended with a carrier liquid, particulate sand, and coupling agent and accelerator, if employed, in any convenient order. After the mixture is blended to provide a uniform distribution of the ingredients it is pumped into a cased well bore which has been perforated at a level adjacent to a producing formation. The slurry is followed by a driving liquid, e.g. brightstock oil or the like and a portion of the slurry is squeezed out the perforations. The remainder of the slurry fills the well bore to at least cover the perforated area. The well is then shut in to allow the resin to cure. After the resin has cured the cured portion in the well bore is drilled out. If there are no producing formations located below the level of the cured pack it is preferred to drill a hole through the pack which is smaller in diameter than the well bore. This enlarges the effective filtration depth of the cured pack.

Because of the unique characteristics of the cured pack formed by practicing the principles of the present invention a screen assembly, such as shown in FIG. 1 of U.S. Pat. No. 3,621,915 is not required although one may be employed if desired. The cured pack of the present invention, although having a compressive strength and permeability which is greater than that of the cured pack of U.S. Pat. No. 3,621,915, can be drilled much more readily than hereto known cured packs having other similar characteristics.

EXAMPLE 1

A slurry of resin coated sand was prepared in the following manner. A blend of an epoxy resin comprising diglycidyl ether of bisphenol A having an epoxide equivalent weight of 182 to 190 and ethylene glycol n-butyl ether in a weight ratio of 60:40 was prepared. A curing agent comprising p,p-methylene dianiline in a weight ratio of 13:100 (curing agent: resin mixture) was mixed to the epoxy resin mixture. A slurry was then formed by blending together 30 milliters (ml) of the above mixture with 2.4 ml. of amino triethoxysilane (coupling agent; 360 grams of sand ranging in size from about 0.033 to about 0.17 inch and 150 ml. of brightstock oil.

The slurry was blended for about 5 minutes at room temperature and then placed in a water bath maintained at a temperature of 140°F for 15 minutes to simulate heating of the slurry as it is pumped down into a well. Various samples of the slurry were then tested in one of the following manners. Procedure A: One sample was placed in a cell fitted with a moveable piston and compacted under a load of 100 psi to squeeze out the carrying oil except that which filled the pore space of the gravel pack. The cell was then placed in a 140°F bath for 24 hours to allow the resin to cure. Procedure B: A second sample of the slurry was hand packed into a mold and also allowed to cure in a 140°F bath for 24 hours. Procedure A or B was also employed in certain of the following examples to test certain properties of a cured mass.

The cured gravel pack which had been compacted at 100 psi has a compressive strength of 1950 psi and a permeability of about 100 darcies. The hand packed sample had a compressive strength of about 2400 psi and a permeability of about 165 darcies.

EXAMPLE 2

A well with perforations at a density of four feet from 6008 to 6012 feet was treated utilizing a slurry formulation of the present invention. The well, which was a troublesome sand producer, was unsuccessfully treated with sand consolidation resins on two different previous occasions. Seven barrels of a slurry was prepared by blending the following ratio of constituents - 210 gallons of brightstock oil having a viscosity of 1100 centipoise at 80°F; 3800 pounds of gravel ranging from about 0.017 to 0.033 inch; 3 gallons of gamma aminopropyl triethoxy silane and 38 gallons of the resin-solvent mixture described in Example 1. This slurry contains a total of about 5.6 pounds of resin and curing agent per 100 pounds of sand. The well was prepared for treatment by performing a matrix acidizing treatment with 200 gallons 15% HCl followed by 200 gallons regular Mud Acid. The Mud Acid was followed with six barrels filtered field salt water, 10 barrels diesel oil, 1 barrel brightstock oil, seven barrels of the slurry mix of the invention, three barrels brightstock oil, a wiper plug, and 22 barrels of diesel oil. When approximately 4¾ barrels of the slurry mix had been squeezed out the perforations, the injection pressure increased rapidly from 1500 psi to 3000 psi indicating a sandout or screenout. At this point, with approximately 2¾ barrels of slurry still inside the well bore, pumping was ceased and the well was shut in. After waiting overnight for the resin to cure and bond the gravel together, the consolidated gravel inside the well bore was drilled out using conventional techniques. With 5000 pounds weight on the bit, the cured bonded gravel drilled out at a rate of nearly two-thirds foot per minute. This drilling rate is about 5 times faster than that at which cured neat portland cement, frequently used in cement squeeze work in the oil field, can be drilled out. One month later the well was reported to be producing close to 340 barrels of fluid per day, sand-free.

EXAMPLE 3

The compressive strength of various resin-sand slurries was determined by Procedure B described in Example 1. In each sample a slurry was prepared containing 200 ml. of brightstock oil (viscosity 1100 centipoise at 80°F); sand (0.017 to 0.033 inch) 480 grams; gamma aminopropyl triethoxy silane 3.2 ml.; and a resin mixture (resin, solvent and curing agent) 40 ml. The resin employed was diglycidyl ether of bisphenol A. The curing agent was p,p-methylene dianiline. Table 1 sets forth the per cent by weight of resin, solvent and curing agent present in the resin mixtures. The results of the tests are set forth in the following Table I.

TABLE I

| Test No. | Resin Per Cent by wt. | Solvent | % wt. | Curing Agent | % wt. | Cure Time | Cure Temp | Compressive Strength |
|---|---|---|---|---|---|---|---|---|
| 1 | 60 | ethylene glycol n-butyl ether (EGB) | 40 | [2]MDA | 20.8 | 24 | 140°F | 2400 |
| 2 | 60 | amyl acetate EGB | 30 10 | MDA | 29.8 | 24 | 140°F | 2900 |
| 3 | 60 | xylene diethylene glycol ethyl ether (DEE) | 22.5 17.5 | MDA | 20.8 | 24 | 140°F | 1530 |
| 4 | 60 | EGB DEE | 22.5 17.5 | MDA | 20.8 | 24 | 140°F | 1100 |
| 5 | 50 | EGB | 50 | MDA | 13 | 24 | 140°F | 375 |
| 6 | 60 | amyl acetate | 40 | [3]MDA | 13 | 24 | 90°F | 2280 |

[2]MDA is p,p-methylene dianiline
[3]Includes in addition salicylic acid - 2 per cent by weight of the resin solvent-curing agent-mixture

EXAMPLE 4

The effect of sand concentration on the compressive strength of a cured pack was determined employing two different resin systems.

Resin System A consisted of, as parts by weight, diglycidyl ether of bisphenol A – 60 parts; ethylene glycol n-butyl ether – 40 parts and p,p-methylene dianiline – 13 parts.

Resin System B consisted of, as parts by weight, diglycidyl ether of bisphenol A – 60 parts; amyl acetate — 30 parts; ethylene glycol n-butyl ether — 10 parts and p,p-methylene dianiline — 18.5 parts.

In each slurry the sand ranged in size from about 0.017 to 0.033 inch. The resin system was employed in an amount to provde about 5.6 to 5.7 pounds of resin system per 100 pounds of sand. The quantity of sand employed is set forth in Table II. Gamma aminopropyl triethoxy silane was also employed in the slurries. The slurry was hand compacted and cured at 140°F for from about 18 to 24 hours. The compressive strength of the cured packs are set forth in Table II.

TABLE II

| Test No. | Sand Conc lbs/gal* | Resin System Used | Compressive Strength (psi) |
|---|---|---|---|
| 1 | 15 | A | 2370 |
| 2 | 12 | A | 2050 |
| 3 | 9 | A | 1520 |
| 4 | 6 | A | 500 |
| 5 | 15 | B | 2900 |
| 6 | 5 | B | 378 |
| 7 | 5** | B | 1537 |

*Lb/gal of total liquid used in system
**Used resin conc. of about 11.2 to 11.4 pounds per 100 pounds of sand

EXAMPLE 5

Tests were run to determine the effect of resin concentration and gravel concentration on the permeability of cured systems. The slurries were cured according to Procedure B, Example 1. The resin-solvent-curing agent was that described in Example 1.

TABLE III

| Pounds Active Epoxy Resin and Curing Agent/100 lb sand | Gravel Size U.S. Sieve No. | Gravel Conc lb/gal* | Permeability (darcies) |
|---|---|---|---|
| 8.4 | 40–60 | 10 | 23 |
| 11.2 | 20–40 | 7.5 | 45 |
| 14.0 | 20–40 | 15 | 20.5 |
| 5.6 | 20–40 | 15 | 76.0 |
| 5.6 | 40–60 | 15 | 165.0 |

*Lb/gal of total liqiud in system

EXAMPLE 6

The effect of sand size on the permeability of a cured pack was determined using the resin-solvent-curing agent system and Procedures A and B described in Example 1. The results of these tests are set forth in the following Table IV.

TABLE IV

| Gravel Size | | Natural Gravel Permeability (darcies) | Permeability (darcies) | |
|---|---|---|---|---|
| Diameter (inches) | U.S. Sieve Number | | Compacted | Uncompacted |
| .066 × .094 | 8–12 | 200+[1] | 200+ | 200+ |
| .033 × .079 | 10–20 | 200+ | 200+ | 200+ |
| .023 × .047 | 16–30 | 171 | 119 | 146 |
| .017 × .033 | 20–40 | 110 | 99 | 165 |
| .010 × .017 | 40–60 | 46 | 40 | 76 |

[1]The upper limit of the permeability apparatus was 200 darcies

EXAMPLE 7

In this example the effects of gravel size and resin concentration on the drill rate of cured packs was determined. The resin-solvent-curing agent system and Procedure B of Example 1 were employed. The drilling rate was determined employing a standard core drill. The time to drill completely through a 2 inches thickness of cured slurry was utilized to determine the drilling rate. The results of these tests are set forth in the following Table V.

TABLE V

| Test No. | Gravel Size U.S. Sieve No. | Resin Conc. lbs/100 lbs sand | Compressive Strength (psi) | Drilling Rate (mm/sec) |
|---|---|---|---|---|
| 1 | Meat Portland cement (46% water) cured at 170°F for 24 hours | | 5123 | .78 |
| 2 | 20–40 | 5.6 | 2370 | 5.88 |
| 3 | 20–40 | 14.0 | 2370 | 4.04 |
| 4 | 10–20 | 5.6 | 1530 | 4.55 |
| 5 | 10–20 | 14.0 | 3004 | 1.54 |
| 6 | 16–30 | 5.6 | 2260 | 5.53 |
| 7 | 16–30 | 14.0 | 2413 | 2.79 |
| 8 | 40–60 | 5.6 | 1472 | 7.28 |
| 9 | 40–60 | 14.0 | 1946 | 2.70 |

EXAMPLE 8

In this example slurries containing the Resin System A and/or B as described in Example 4 were prepared containing different sand sizes, and concentrations of resin system per 100 pounds of sand. Compressive strengths were determined by employing the hand compaction procedure described in Example 1.

TABLE VI

| Resin System | Gravel U.S. Sieve No. | Resin Conc. lbs/100 lbs Sand | Compressive Strength (psi) |
| --- | --- | --- | --- |
| A | 20–40 | 14 | 2370 |
| A | 20–40 | 5.6 | 2370 |
| A | 20–40 | 4.5 | 1640 |
| A | 20–40 | 3.4 | 760 |
| A | 20–40 | 2.8 | 525 |
| B | 10–20 | 5.7 | 2286 |
| B | 10–20 | 4.6 | 2300 |
| B | 10–20 | 3.4 | 1725 |
| B | 16–30 | 5.7 | 2740 |
| B | 16–30 | 4.6 | 2370 |
| B | 16–30 | 3.4 | 770 |

What is claimed is:

1. A method of forming a permeably consolidated particulate mass in communication with a permeable subterranean formation which comprises:
   a. forming a pumpable slurry by mixing together a particulate material, an epoxy resin-solvent mixture, a curing agent, a coupling agent and a carrier liquid to form a slurry, said particulate material ranging in size from about 0.1 to about 0.0025 inch in diameter and is present in an amount ranging from about 7 to about 20 pounds per gallon of liquid in said slurry, said resin-solvent mixture comprising an epoxy resin and a polar organic solvent for said resin, said solvent in conjunction with said resin being only partially miscible with said carrier liquid, said resin being present in an amount ranging from about 2 to about 10 pounds per 100 pounds of particulate material, said resin-solvent mixture containing from about 55 to about 85 percent by weight of resin,
   b. introducing said slurry into a well bore and in communication with said permeable formation, and
   c. curing said slurry in place to form a consolidated permeable mass.

2. The method of claim 1 wherein said slurry is placed in communication with said formation and also in said borehole, said slurry in communication with said formation and said borehole is cured to form a permeable consolidated mass and a portion of the consolidated mass located in said borehole is removed to provide a consolidated mass extending from said borehole and into contact with said formation.

3. The method of claim 1 wherein said particulate material is a siliceous material and said coupling agent is an organo-silicon compound.

4. The method of claim 3 wherein said resin is provided in an amount ranging from about 2.5 to about 9 pounds per 100 pounds of particulate material.

5. The method of claim 3 wherein said particulate material ranges in size from about 0.065 to about 0.01 inch in diameter.

6. The method of claim 5 wherein said particulate material is present in an amount ranging from about 9 to about 15 pounds per gallon of liquid and said resin is present in an amount ranging from about 2.5 to about 9 pounds per 100 pounds of particulate material.

7. The method of claim 1 wherein the carrier liquid is a hydrocarbon oil having a viscosity at 80°F ranging from about 100 to about 2500 centipoise.

8. The method of claim 7 wherein said particulate material is sand which ranges in size from about 0.065 to about 0.01 in diameter, said sand is present in an amount ranging from about 9 to about 15 pounds per gallon of liquid in said mixture, and said resin is present in an amount ranging from about 2.5 to about 9 pounds per 100 pounds of sand.

9. The method of claim 8 wherein a sufficient amount of said mixture is pumped into said well to form a mass against said formation and also in the well bore and said entire mass is cured.

10. The method of claim 9 wherein a portion of said cured mass located in said well bore is removed.

11. The method of claim 9 wherein said pumpable slurry comprises a liquid resin-solvent mixture comprising a diglycidyl ether of bisphenol A epoxy resin dissolved in ethylene glycol n-butyl ether in a weight ratio of 60:40, respectively in said resin-solvent mixture, a curing agent consisting of p,p-methylene dianiline, said resin-solvent mixture comprising 38 parts by volume of said pumpable slurry, sufficient sand to provide about 5.6 pounds of resin per 100 pounds of sand, 210 parts by volume of a carrier oil in said pumpable slurry and 3 parts by volume of gamma aminopropyl triethoxy silane in said pumpable slurry.

* * * * *